Feb. 5, 1957          J. D. GAYER          2,780,762
REVERSING SWITCH CONTROL
Filed Sept. 15, 1954          3 Sheets-Sheet 1
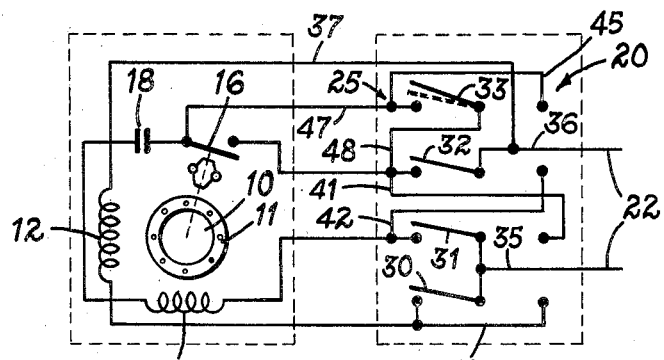
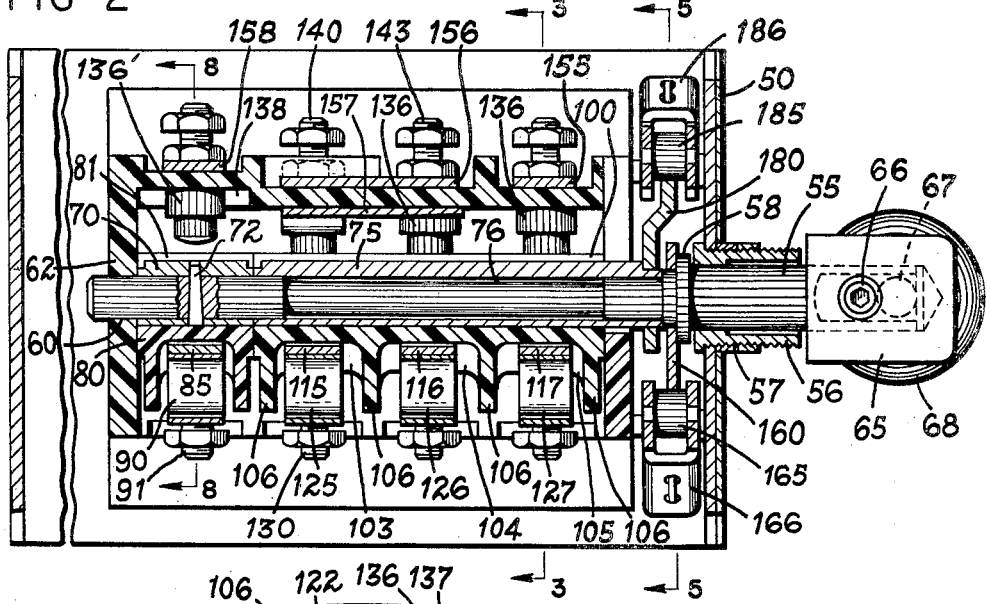
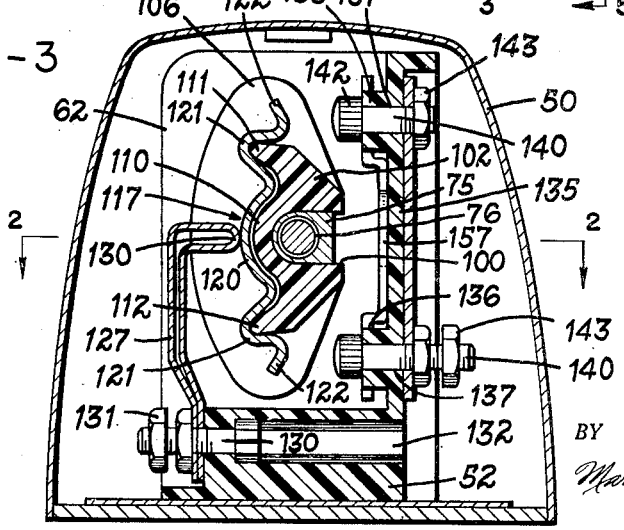
INVENTOR.
JOHN D. GAYER
BY
Marechal, Biebel, Frauch & Bugg
ATTORNEYS Feb. 5, 1957   J. D. GAYER   2,780,762
REVERSING SWITCH CONTROL
Filed Sept. 15, 1954   3 Sheets-Sheet 2

INVENTOR.
JOHN D. GAYER
BY
Marechal, Biebel, French & Bugg
ATTORNEYS

Feb. 5, 1957 J. D. GAYER 2,780,762
REVERSING SWITCH CONTROL
Filed Sept. 15, 1954 3 Sheets-Sheet 3

INVENTOR.
JOHN D. GAYER
BY
Marechal, Biebel, French & Bugg
ATTORNEYS

United States Patent Office 2,780,762
Patented Feb. 5, 1957

2,780,762

REVERSING SWITCH CONTROL

John D. Gayer, Dayton, Ohio, assignor, by mesne assignments, to The Clark Controller Company, Cleveland, Ohio, a corporation of Ohio Application September 15, 1954, Serial No. 456,227

12 Claims. (Cl. 318—207)

This invention relates to reversing electric motors, particularly induction motors having starting windings adapted to be energized in opposite directions to obtain starting of the motor in either forward or reverse directions.

Such motors include a rotor, generally of the squirrel cage type, a primary or running winding in the stator, and a starting or auxiliary winding displaced spatially from the main winding and having phase displacing means such as a capacitor connected in series with the starting winding. Both windings are connected in parallel to a single phase supply line, and the phase displacing means causes displacement between the currents in the two windings which provides a starting torque for the motor.

A centrifugal switch operated by the rotor is connected in series with the starting winding to disconnect it from the power supply when the motor reaches a predetermined speed, generally about 75 percent of rated or normal running speed, and the motor then runs as a single-phase induction motor. In order to reverse the motor, the starting winding must be energized in the opposite direction, but once the motor is up to rated speed the centrifugal switch prevents energization of the starting winding, and thus it becomes necessary to deenergize the entire motor, wait for it to slow down until the centrifugal switch closes, and then start again in the opposite direction.

In certain instances this waiting period may be highly undesirable and the present invention is directed to a control system and a switch for use in such system whereby the centrifugal switch may be bypassed when it is desired to reverse the motor, and the starting winding energized in a direction reverse to the direction in which the motor is running. This produces a braking torque acting against the rotation of the motor which brings it to a quick stop and starts it running in the opposite direction.

In accordance with the invention a reversing switch is provided having a central open position and running positions on opposite sides of the central position, and detent means are included to normally hold the switch in one of these three positions as selected. Thus, in the forward and reverse positions the starting winding is connected in either forward or reverse direction to the supply line, and in the open position both the starting and running windings are deenergized.

An auxiliary switch is connected to afford a bypass around the centrifugal switch from the starting winding to the starting connections of the main reversing switch. This auxiliary switch is held open in all three positions of the main switch, but is mechanically linked to the main switch in such a way that movement of the main switch control to the forward and reverse positions of the detent means, that is, in a direction away from the open position, will close the auxiliary switch. Upon release of the switch handle, the main switch remains in the adjacent running position under bias from the detent means, but the auxiliary switch is opened by a separate biasing force and maintained open during normal running.

A primary object of this invention therefore is to provide a control system for reversing a single-phase induction type motor which is simple to operate and which acts instantaneously to reverse the motor.

Another object of this invention is to provide a reversing switch for an electric motor which is simple and inexpensive to manufacture, which is compact in construction, and which may be wired to existing motors without substantial rebuilding or alteration thereof.

A further object of the invention is to provide a manually operated reversing switch for a single-phase induction type motor which includes a bypass switch for reversing the energization of the motor starting winding immediately upon movement of the reversing switch for reversing the motor, and wherein means are provided for opening the bypass switch as the manual operating pressure on the reversing switch is released.

An additional object of this invention is to provide a double-throw switch having one contact which is biased into a normally open position but which may be moved to a plurality of closed positions by a force overcoming the biasing means, and having another contact which is held in each of its three positions by detent means which act in opposition to the aforementioned biasing means, and wherein closing movement of the one contact effects closing movement of the other contact.

Another object of the invention is to provide a switch having a rocker arm movable by a shaft wherein finger portions extend from the rocker arm to engage a contact strip which is substantially complementary to the rocker arm and the finger portions, and wherein a spring urges the contact strip onto the rocker arm to provide for pivotal movement of the strip about the finger portions in a direction opposite to rocking movement of the shaft for wiping the ends of the contact strip against associated contact buttons.

Other objects and advantages of the invention will be apparent from the following description, the accompanying drawings and the appended claims.

In the drawings—

Fig. 1 is a schematic wiring diagram of an induction motor provided with the starting and reversing switch of the present invention;

Fig. 2 is a horizontal section through the switch provided in accordance with the invention taken along the line 2—2 of Fig. 3;

Fig. 3 is a vertical section of the switch construction taken along line 3—3 of Fig. 2;

Figure 4:
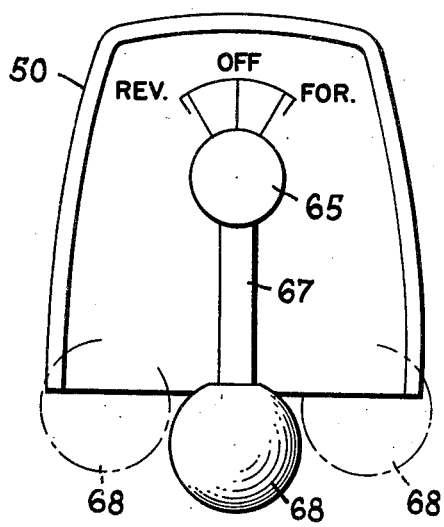
Fig. 4 is an end view of the switch as seen from the right of Fig. 2.

Referring to the drawing, which illustrates a preferred embodiment of the invention, and especially to Fig. 1, there is seen a schematic diagram of a single-phase induction type electric motor having a rotor 10 provided with a winding 11, generally of the squirrel cage type, and a primary or running field winding 12 providing energization for the motor. Displaced spatially from the primary winding, usually in quadrature relation thereto, is a starting or secondary winding 15 which is energized only during starting of the motor. A centrifugal switch 16 operated by the rotor is connected in series with the starting winding 15 in such a way that when the motor is at rest the switch 16 is closed, and remains closed until the rotor has reached a speed which is about 75 percent of the rated motor speed, at which time the switch opens and the motor continues to run as a simple induction type single-phase motor. A suitable phase displacement means such as capacitor 18 is included in the starting circuit with winding 15 to effect a phase displacement of the current to this winding in a well known manner, thus providing in effect a split-phase or two-phase motor during starting.

In accordance with the invention a manually operated reversing switch indicated generally at 20 in Fig. 1 is connected to the motor to control it. The switch is connected to a single-phase power supply 22 and connects the primary winding 12 and the starting winding 15 in parallel to the power supply. When it is desired to reverse the rotation of the motor the switch provides for reversing the energization of the starting winding by connecting it in the opposite direction to the power supply, thereby causing the motor to start in the opposite direction to which it has been running. As previously explained, once the motor has reached rated speed and the centrifugal switch 16 is opened the starting winding normally cannot be energized, and it is thus impossible to effect reversal of the motor until it is stopped or at least slowed down sufficiently to permit this switch to close, after which time the power may be supplied in reverse direction to the starting winding and the motor caused to rotate in the opposite direction.

The present invention avoids this necessity of waiting by including an auxiliary switch or bypass within the main control which is connected to complete a bypass circuit 25 about the centrifugal switch 16, and thus to effect immediate energization of the starting winding in the opposite direction when it is desired to reverse the motor. Since the secondary winding 15 is normally not intended to withstand the full load current to the motor, it should not be energized during the entire period of bringing the motor up to rated speed, since to do so might cause secondary winding to burn out. The auxiliary switch is therefore designed to be closed only upon forced deliberate movement of the control switch in a predetermined manner.

Switch 20 is illustrated schematically as including four movable blades 30, 31, 32 and 33 which rotate about a central or fixed contact between opposite poles, in the same general manner as a double-throw switch. One line 35 of the power supply 22 is connected to the central contact of blades 30 and 31, and the other line 36 is connected to the central contact of blade 32 and also, through a wire 37, to one end of the main winding 12. The opposite poles of blade 30 are connected by a strip 40 which in effect provides for energization of the main or primary motor winding 12 at both closed positions of blade 30. The opposite poles of blades 31 and 32 are connected to energize secondary winding 15, through centrifugal switch 16, in one direction when the blades contact one set of poles, and in the reverse direction when the blades contact their other set of poles, by criss-crossing the poles of blades 31 and 32 with connectors 41 and 42. The fourth blade 33 has its opposite poles connected together by a strip 45, and is wired to bypass the switch 16 by means of conductors 47 and 48, so that when blade 33 contacts either of its opposite poles it shunts the centrifugal switch 16 out of the reversing circuit which includes blades 31 and 32, and provides for energization of the secondary winding 15 irrespective of the setting of the centrifugal switch.

Referring to Fig. 2, there is seen a reversing switch constructed in accordance with the invention to incorporate the above mentioned features and including an outer housing 50 within which is enclosed a base 52 supporting the switch structure. A main shaft 55 is journaled at one end within a bushing 56 which is threaded into housing 50 at 57, and is held in place within the bushing by a collar 58. The other end of shaft 55 is supported for rotation in a bore 60 through the rear wall 62 of base 52. Means are provided for rocking the shaft 55 by attaching a cap 65 thereto with a set screw 66, and this cap has a handle shaft 67 extending substantially radially therefrom and terminating in a handle ball or grip 68.

Figure 8:
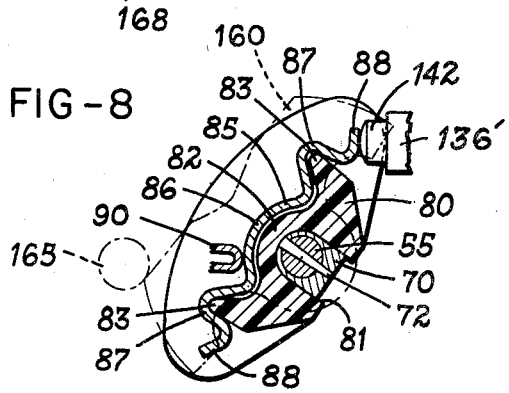
Fig. 8 is a partial section taken along line 8—8 of Fig. 2, but showing the switch parts therein at one closed position.

A short hollow shaft segment 70 which is half round and half rectangular in cross-section, as seen in Fig. 8, is secured to the main shaft 55 by a pin 72 extending transversely through the shaft and the segment. A hollow auxiliary shaft 75, identical in cross-section to segment 70, is received coaxially upon the main shaft between the segment 70 and collar 58, and is independently rotatable upon main shaft 55. The main shaft is preferably undercut at 76 within a major portion of the auxiliary shaft 75 to prevent binding between these two shaft members upon rotation thereof.

Resting on the shaft segment 70 is a rocker arm 80 which is seen in cross section in Fig. 8 as including a central aperture 81 half round and half rectangular in section so as to be received about the segment 70 and providing for rocking movement of the rocker arm upon rocking of the shaft. The center portion 82 of the rocker arm, opposite from aperture 81, is substantially arcuate in cross section, the axis of this arcuate section being substantially the same as the axis of the half round portion of aperture 81. Extending radially outwardly from the rocker arm at either end thereof are finger portions 83 which merge smoothly into the arcuate center section 82 and over which a contact strip 85 having an arcuate center section 86, finger portions 87 formed complementary to rocker arm finger portions 83, and contact portions 88 at opposite ends of the strip and turned away from the finger portions 87 so as to extend outwardly of the rocker arm in operative position. It will thus be seen that the contact strip 85 fits over rocker arm 80 which in turn fits over the shaft segment 70, and these parts are maintained in engagement by means of a contact spring 90 pressing laterally against the strip 85 adjacent the center portion 86 thereof, and which spring is secured at its other end to base 52 by means of a bolt 91.

Referring to Fig. 3, the auxiliary shaft 75 is seen to pass through the central aperture 100 of a rocker arm 102 which is identical in cross section to rocker arm 80, but which is considerably greater in length and is divided longitudinally into three separate segments 103, 104 and 105 by a plurality of identical walls 106 extending radially from a rocker arm 102.

Within each of the segments 103, 104 and 105 there is formed a central arcuate portion 110 and finger portions 111 and 112 extending laterally of the rocker arm in the same manner as the finger portions on rocker arm 80. Also in like manner, contact strips 115, 116 and 117, each having an arcuate center portion 120, finger portions 121, and contact portions 122, are set within the several segments of rocker arm 102 and are held in place by contact springs 125, 126 and 127 which have curved nose portions 130 for pressing the contact strips 115, 116 and 117 into engagement with a rocker arm 102, and for pressing the rocker arm into locking engagement with auxiliary shaft 75, as seen in Fig. 3.

Figure 11:
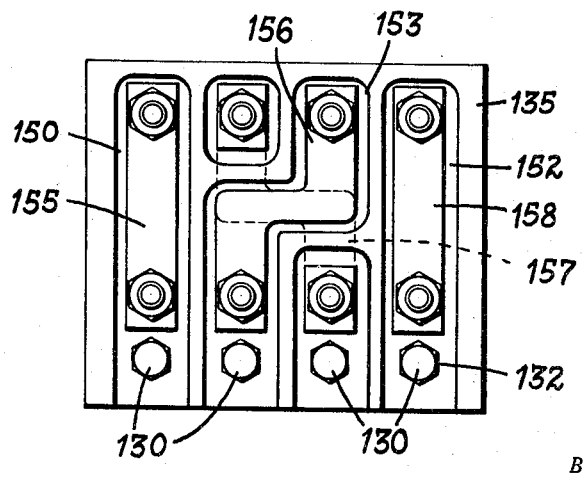
Fig. 11 is a view of the binding posts of the switch as seen from the top of Fig. 2.

The opposite ends of each spring 125, 126 and 127 are bolted to base 52 by bolt and nut fasteners 130, each provided with an additional nut 131 to serve as contact posts for the switch, the bolts 130 being equivalent to the central contacts of 30, 31, 32 and 33 of Fig. 1, and the contact strips 117, 116, 115 and 85 being equivalent to the switch blades 31—33 respectively. Each of bolts 130, and also bolt 91, are received in extended apertures 132 within base 52 and substantially hexagonal in cross-section, as seen in Fig. 11, to lock the bolts against turning within the base.

Base 52 includes a side 135 having a plurality of bosses 136 extending inwardly therefrom and each having a central aperture 137 formed therethrough. In all, there are eight of these bosses, six of them being arranged in a common vertical plane parallel to side 135 and by pairs in alignment with the contact strips 115, 116 and 117, and the rearmost two of these bosses (indicated at 136') are set into side 135, within a recess portion 138 (Fig. 2), at a greater distance laterally from the shaft. It will be noted that recess 138 is in line with the shaft segment 70. Extending through each of the apertures 137 are stub shafts 140 having enlarged and rounded heads 142 providing contact buttons for engaging each of the contact portions 88 and 122 of the respective contact strips, and certain of the stub shafs are elongated and provided with additional nuts, as at 143 in Fig. 3, to provide contact posts for the switch.

In the preferred embodiment of the switch the outer portion of the side 135 has formed therein several elongated recesses 150 and 152 (Fig. 11) extending between the upper and lower contact buttons of the associated switch structure, and a central Z-shaped recess 153 which connects the lower contact button of one switch with the upper contact button of the adjacent switch. A metal bar or shunt 155 connects the upper and lower contact buttons associated with contact strip 117, and is the equivalent of the connector 40 seen in Fig. 1. A Z-shaped bar 156 connects the upper contact button of strip 115 with the lower button of opposite strip 116, and is the equivalent of the cross over connection 42 of Fig. 1. A similar Z-shaped bar 157 connects the upper contact button for strip 116 with the lower button for strip 115 on the inner face of side 135, being equivalent to the cross over connection 41 of Fig. 1. A fourth bar 158 connects the upper and lower contact buttons associated with strip 85 thus providing the connection indicated at 45 in Fig. 1.

It will thus be seen that the above described structure provides in effect a triple-pole double-throw switch including contact strips 115, 116 and 117, and an independently operable single-pole double-throw switch including contact strip 85. Each of these switches is arranged for rocking movement between a central open position and closed positions in opposite directions from the central position, but the rocking movement necessary to close the single-pole switch is greater than the movement to close the triple-pole switch, due to the recessed condition of the contact buttons for strip 85.

The single pole switch, including contact strip 85, is equivalent to blade 33 of the schematic diagram in Fig. 1, and as previously explained, since this switch is wired to by-pass the centrifugal switch 16, it must normally remain open to prevent energization of secondary winding 15 when the motor is up to full speed. In order to bias the main shaft 55 into a neutral position, wherein the contact strip 85 is spaced from its associated contact buttons, a cam plate 160 (Fig. 5) is secured thereto for rotation with the shaft. This plate has an outer cam surface 161 including a central dip 162 formed therein, and a roller type follower 165 is held at a free end of a follower arm 166 by a pin 167. This arm is pivoted to base 52 on a pin 168, and the side of the arm has a pair of openings 169 formed therein and traversed by a cross piece 170 about which is hooked one end of a tension spring 172. The other end of the spring is hooked about a fixed pin 175 at the lower center of base 52, so the spring maintains the roller 165 and contact with surface 161, urging the roller into the central dip 162 wherein the plate 160 is in its neutral position.

A second cam plate 180 is secured to the hollow auxiliary shaft 75 and includes three semi-circular notches 181, 182 and 183 formed in the periphery of plate 180 to be selectively engaged by a roller 185 mounted on the free end of an arm 186, which is in turn pivoted at its other end to base 52 by a pin 187. In like manner to arm 166, a tension spring 190 is hooked at one end about a transverse portion 191 of the arm, and the other end of the spring is hooked about the central pin 175. Thus roller 185 cooperates with the three notches in plate 180 to provide detent means for positioning the auxiliary shaft 75 in a central open position, when the roller engages notch 182, and closed positions in opposite directions from the open position when the roller is received in either notch 181 or notch 183, and at which closed position the contact strips 115, 116 and 117 engage either their upper or lower contact buttons, depending upon the direction of rotation of the auxiliary shaft. The periphery of plate 180 at 188 adjacent the outer edges of notches 181 and 183 extends beyond the center of roller 185, thus preventing rocking of the plate beyond the closed positions.

There is no direct connection between the handle 67 and the auxiliary shaft 76, and so to provide for rotation of the auxiliary shaft the peripheral portion of plate 180 is bent to one side of its central portion which is attached to hollow shaft 75, so as to be substantially coplanar with the plate 160, which is in turn rigidly attached to shaft 55, as seen in Fig. 3. The plate 160 terminates in opposite edges 195, 195' which extend along radial lines from the pivot point of plate 160, and plate 180 terminates in like edge portion 196, 196' which are coplanar with the edge portions 195 but spaced therefrom.

Figure 5:
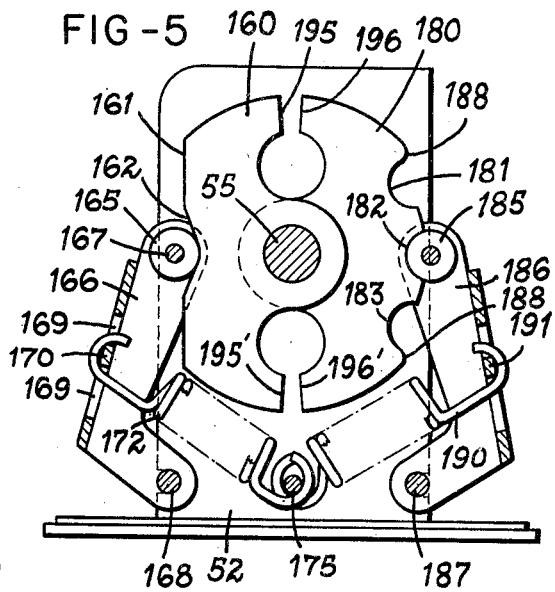
Fig. 5 is a partial section taken along line 5—5 of Fig. 2.
Figure 6:
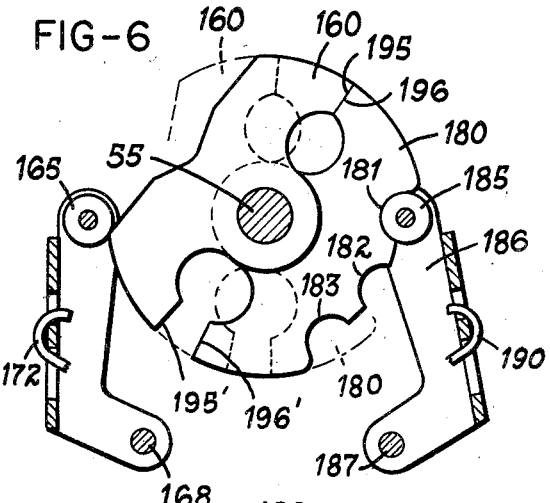
Fig. 6 is a partial section similar to Fig. 5 showing the parts therein in an adjusted position.
Figure 7:
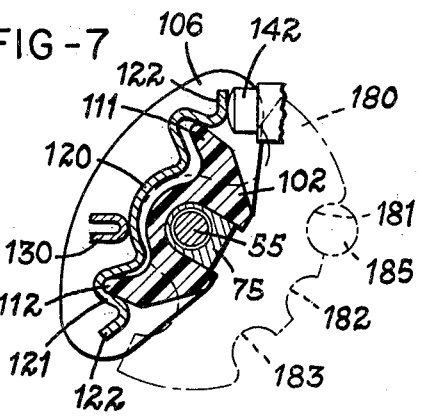
Fig. 7 is a partial section similar to Fig. 2 showing the parts therein at one closed position of the switch.

In operating the switch the handle 67 is rotated until either edge 195 engages edge 196, this position being shown in dotted lines in Fig. 6, or edge 195' contacts edge 196'. Continued rotation of the handle results in rocking of auxiliary shaft 75 toward one of its closed positions, wherein the detent roller 185 holds the plate 180, and thus also the auxiliary shaft and its associated rocker arm 102. In Fig. 7 rocker arm 102 is seen in one of its closed positions, resulting from clockwise movement of handle 67. At the same time, shaft segment 70 and its associated rocker arm 80 have been rocked to a closed position, seen in Fig. 8, and the contact strip 85 is leading the other three contact strips 115, 116 and 117 by an angular distance equivalent to the angular movement of plate 160 from its neutral position to the point where edge 195 first engages edge 196. It will be seen that this "lead" distance is equal to the angular spacings between these two edges in their "at rest" or neutral position as seen in Fig. 5.

With the switch in such fully closed position a condition is reached wherein all the contact strips are in use, equivalent to closing of all four blades in the schematic diagram of Fig. 1. Assuming that the motor has been running, the energization of starting winding 15 is now instantaneously reversed, and this winding produces a braking torque which brings the rotor 10 to an immediate stop and initiates its rotation in the opposite direction. Once the motor has come up to rated speed in its reverse direction the centrifugal switch 16 will open, and there is no further need for maintaining the starting circuit closed. Rather, it is desirous to open the starting circuit to permit the motor to continue running as an induction-type motor.

Figure 9:
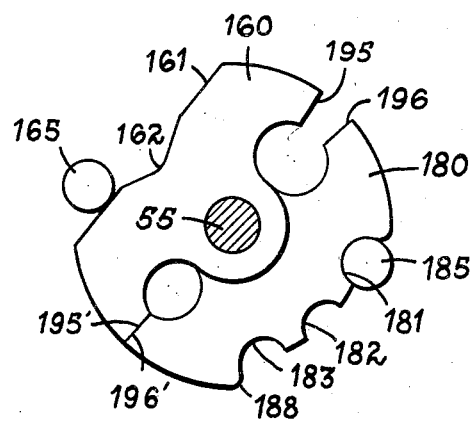
Fig. 9 is a partial section similar to Fig. 5 and Fig. 6, illustrating the parts therein at a further adjusted position.
Figure 10:
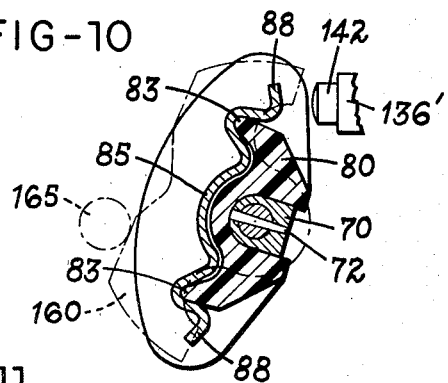
Fig. 10 is a partial section on the same elements seen in Fig. 8, illustrated in their adjusted open position.

By merely releasing the handle 67 as the motor comes up to speed, the operator can break the bypassing circuit 47, because of the action now to be described which immediately takes place within the switch upon release of the manual force upon the handle. Referring to Fig. 9, it will be seen that the biasing force of spring 72 through roller 165 upon cam plate 160 causes the plate to rock in a reverse direction toward its central closed position, until this reverse rocking is interrupted by contact between the opposite edges 195' and 196' of plates 160 and 180. This biasing force causes main shaft 55 to rock through an angular movement equivalent to twice the spacing between the edges 195 and 196, while the plate 180 is held stationary by its detent roller 185. Since the auxiliary shaft 75 is thereby maintained in a closed position the contact strips 115, 116 and 117 also remain closed, but shaft segment 70 and rocker arm 80 move away from their closed position and contact strip 85 finally comes to rest in a position which is approximately half way between its closed position and its normal open position, but wherein it is effective to pass electrical energy between the contact strip 85 and its associated contact button.

It will thus be seen that the reversing switch provided by this invention affords substantially instantaneous control over a split-phase starting induction type motor. The switch itself is of simple and ingenuous construction with the contact parts of the switch easily removable for cleaning or replacement. The contact buttons 142 are held in place upon the bosses 136 by means of a single nut which may be removed to permit withdrawal of the stub shafts 140 terminating in the contact buttons. Also, by removing the nuts of the several bolt and nut fasteners 130, contact springs 90, 125, 126 and 127 may be removed from the base 52 and the rocker arms 80 and 102 slipped off shaft segment 70 and auxiliary shaft 75 respectively. The contact strips 85, 115, 116 and 117 may be slipped off the rocker arms for cleaning or replacement.

In addition, the construction of the switch provides for a wiping action of the contact portions 88 and 122 of the contact strips across the contact buttons 142. For example, comparing Figs. 3 and 7 it will be noted that upon closing movement of the switch the rocker arm 102 is rocked through a somewhat greater angle than is necessary to provide contact between strip portion 122 and button 142. The excessive angular movement of the rocker arm causes the contact strip 120 to pivot in a reverse direction from the rocking movement of the arm, with the finger portion 121 of the strip pivoting about finger portion 112 of the rocker arm, and the entire strip pivoting in reverse direction against the nose 130 of the contact spring. Thus, between the initial contact of portion 122 and button 142 and the final closed position of rocker arm 102 there results a wiping action of the contact portion 122 across the face of button 142. The same wiping action is provided at the opposite closed position of the switch, as will be apparent from Fig. 3, with the strip 120 pivoting about finger portion 111 of the rocker arm.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a control circuit for quickly reversing a split-phase starting single-phase motor including a main winding and a starting winding having phase splitting means in series therewith, the combination of a running circuit including said main winding and a main switch for breaking said running circuit, a starting circuit including said starting winding and automatic switch means in circuit therewith for opening said starting circuit when said motor has reached said operating speed, a bypass switch connected in said starting circuit to bypass said automatic switch means, biasing means normally urging said bypass switch open, means for urging said bypass switch closed in opposition to said biasing means, reversing switch means in said starting circuit for reversing the energization of said starting winding, detent means for retaining said reversing switch means in positions for forward and reverse running of said motor, and means linking said bypass switch to said reversing switch to provide for closing of said reversing switch upon movement of said bypass switch to closed position against said biasing means, said detent means acting to hold said reversing switch in one of said running positions upon release of said bypass switch and opening thereof by said biasing means.

2. In a starting and reversing switch for a motor having starting and running circuits and automatic switch means for opening the starting circuit at a predetermined rotational speed of the motor, the combination of a housing, a main shaft mounted for rotation in said housing and including a handle providing for manual rotation thereof between an open position and forward and reverse running positions in opposite directions from said open position, a contact secured transversely to said main shaft for rocking thereby, an auxiliary shaft in said housing including a plurality of contacts mounted transversely thereon for rocking thereby, detent means for holding said auxiliary shaft in a central open position and forward and reverse running positions in opposite directions from said open position to provide for forward and reverse energization of said running circuit, cooperating cam means on said shafts providing for rotation of said auxiliary shaft only after predetermined rotation of said main shaft to cause said contacts on said main shaft to lead said plurality of contacts for bypassing said automatic switch means and instantaneously reversing the energization of said starting circuit upon movement of said handle from one of said running positions to the opposite said running position, and means biasing said main shaft toward said open position.

3. In a control circuit for a split-phase starting single-phase motor having a main winding, a starting winding displaced from said main winding and including phase displacing means in circuit therewith, and circuit braking means in circuit with said starting winding for opening and closing the circuit of said starting winding in response to the speed of said motor, the combination of a unitary control device for effecting quick reversal of said motor including a triple-pole double throw switch having one pair of poles thereon connected in circuit with said main winding to provide for energization thereof at both said closed positions of said switch, the other pairs of poles of said switch being connected in circuit with said starting winding to provide for forward and reverse energization thereof at opposite closed positions of said switch, detent means for holding said switch in said closed positions, a bypass switch wired to bypass said circuit breaking means to provide for instantaneous reversal of the starting field set up by said starting winding and thus to initially provide a braking torque for stopping said motor prior to reversal thereof, means biasing said bypass switch normally open, and means linking said bypass switch to said triple-pole double-throw switch to provide for closing of both said switches only upon forceable overriding of said biasing means and for opening said bypass switch upon release of the overriding force.

4. In a switch of the character described the combination of a main shaft, a contact mounted on said main shaft for rocking movement between a central open position and closed positions in opposite directions from said open position, means for rocking said shaft, biasing means urging said main shaft into said open position, an auxiliary shaft having a contact mounted thereon for rocking movement between a central open position and closed positions in opposite directions from said open position, means operated by said rocking means providing for rocking said auxiliary shaft in response to rocking of said main shaft, and detent means operatively associated with said auxiliary shaft for retaining said auxiliary shaft in each of its said positions as said main shaft is urged into its open position by said biasing means.

5. In a switch of the character described the combination of a main shaft, a contact mounted transversely on said main shaft for rocking movement between a central open position and closed positions in opposite directions from said open position, means for rocking said shaft, biasing means urging said main shaft into said open position, a hollow auxiliary shaft supported coaxially upon said main shaft for independent rocking movement thereon, a contact mounted transversely on said auxiliary shaft for rocking motion between a central open position and closed positions in opposite directions from said open position, detent means for holding said auxiliary shaft in each position of its said contact strip, and cooperating cam means on said main shaft and said auxiliary shaft for rocking said auxiliary shaft in response to rocking of said main shaft, said detent means being effective to hold said auxiliary shaft in any of its said positions in opposition to said biasing means and ineffective to retain said main shaft in its closed positions against said biasing means.

6. In a starting and reversing switch for a motor having starting and running circuits and automatic switch means for opening the starting circuit at a predetermined rotational speed of the motor, the combination of a housing, a main shaft mounted for rotation in said housing, a contact strip secured transversely to said main shaft for rocking thereby between a central open position and closed forward and reverse running positions on opposite sides of said running position, means biasing said shaft toward said open position, contact buttons on said housing for selective engagement with the opposite ends of said contact strip at said running positions thereof, an auxiliary shaft rotatably mounted in said housing and having a plurality of contact strips secured transversely thereto, reversing contact buttons on said housing adapted to be connected into said starting circuit to provide for reversing the energization thereof and being selectively engageable with opposite ends of each of said plurality of contact strips on said auxiliary shaft, detent means on said auxiliary shaft for holding said auxiliary shaft in a central open position and in forward and reverse running positions in opposite directions from said open position, and cam means carried by said main shaft and coacting with said detent means to rotate said auxiliary shaft into a selected closed position upon rotation of said main shaft, said biasing means being effective to rotate said main shaft while said detent means holds said auxiliary shaft in one of said running positions thereof.

7. In a starting and reversing switch for a motor having starting and running circuits and automatic switch means for opening the starting circuit at a predetermined rotational speed of the motor, the combination of a housing, a main shaft mounted in said housing for rotative movement between a central open position and forward and reverse running positions in opposite directions from said open position, said main shaft having a flattened portion thereon, an arcuate rocker arm having a flattened aperture in the center thereof for locking engagement with said flattened portion and also having radial finger portions spaced along the periphery thereof, a contact strip including an arcuate center portion and complementary finger portions thereon for engagement with said rocker arm, said contact strip also having contact portions at opposite ends thereof, said contact strip being connected to bypass said automatic switch means at said running positions of said main shaft, a contact spring fixed to said housing and engaging said arcuate central portion of said contact strip to hold said strip and said rocker arm in locking engagement on said main shaft, a hollow auxiliary shaft mounted coaxially upon said main shaft and independently rotatable relative thereto, a second rocker arm fixed to said auxiliary shaft, a plurality of contact strips mounted on said second rocker arm substantially parallel to each other and adapted to connect said starting circuit for forward and reverse energization thereof, biasing means urging said main shaft into open position, detent means for holding said auxiliary shaft in a central open position and forward and reverse running positions in opposite directions from said open positions, and cooperating cam means on said main shaft and said auxiliary shaft for rotating said auxiliary shaft in response to rotation of said main shaft, said cam means providing for opening movement of said contact strip on said main shaft while said detent means holds said auxiliary shaft in running position.

8. In a double throw switch the combination of a shaft having a rocker arm thereon extending transversely thereof, means for rocking said shaft, finger portions extending from said rocker arm laterally of said shaft and spaced from each other, an arcuate center portion on said rocker arm between said finger portions, a contact strip including an arcuate center section and substantially complementary to said rocker arm and said finger portions thereon, said strip including contact portions extending from the opposite ends thereof beyond said rocker arm, contact buttons mounted to one side of said shaft and coplanar with said contact portions for selective engagement thereby, and a spring urging said contact strip onto said rocker arm and providing for pivotal movement of said strip about said finger portions in a direction opposite to rocking movement of said shaft for wiping said contact portions against said buttons.

9. In a double throw switch the combination of a housing, a shaft having a flattened portion and mounted for rocking movement in said housing, means for rocking said shaft, a rocker arm having a flattened aperture for locking engagement with said flattened portion of said shaft, said rocker arm having finger portions extending at the opposite ends thereof laterally of said shaft, a contact strip having a central portion complementary to said rocker arm and said finger portions thereon, said contact strip including contact portions extending from the opposite ends thereof beyond said rocker arm, contact buttons on said housing aligned with said contact strip for engagement with a selected one of said contact portions upon rocking of said shaft toward one of said buttons, and a contact spring urging said strip and said rocker arm into locking engagement with each other and with said shaft, said spring being the central pole of said switch and providing for pivotal movement of said strip about said finger portions in a direction opposite to rocking movement of said shaft for wiping said contact portions against the associated said button.

10. In a switch of the character described the combination of a main shaft, a rocker arm mounted transversely on said main shaft for rocking movement between a central open position and closed positions in opposite directions from said open position, means for rocking said shaft, biasing means urging said main shaft into said open position, a hollow auxiliary shaft supported coaxially upon said main shaft for independent rocking movement thereon, a second rocker arm mounted transversely on said auxiliary shaft for rocking motion between a central position and closed positions in opposite directions from said open position, each of said rocker arms including an arcuate center section and finger portions extending from said rocker arms laterally of said shaft at opposite ends of said arcuate center section, contact strips having center portions complementary to said rocker arm and said finger portions thereon, said strips including contact portions extending from the opposite ends thereof beyond said rocker arms, contact buttons mounted to one side of said shafts and coplanar with said contact portions for selective engagement thereby upon rocking movement of said shafts to their respective said closed positions, contact springs urging said contact strips onto said rocker arms and providing for pivotal movement of said strips about said finger portions in a direction opposite to rocking movement of said shaft for wiping said contact portions against said buttons, detent means for holding said auxiliary shaft in each position of said second rocker arm, and cooperating means on said main shaft and said auxiliary shaft for rocking said auxiliary shaft in response to rocking of said main shaft, said detent means being effective to hold said auxiliary shaft in any of its said positions in opposition to said biasing means and ineffective to retain said main shaft in its closed positions against said biasing means.

11. In a double throw switch the combination of a shaft having a rocker arm thereon extending transversely thereof, means for rocking said shaft, finger portions extending from said rocker arm laterally of one side of said shaft, a contact strip carried by said rocker arm and including portions formed substantially complementary to said finger portions, said strip also including contact portions extending from opposite ends thereof beyond said rocker arm, contact members mounted on the opposite side of said shaft from said finger portions and in alignment with said contact portions for selective engagement thereby, and a contact spring urging said contact strip onto said rocker arm and providing for pivotal movement of said strip about said finger portions in a direction opposite to rocking movement of said shaft for wiping said contact portions against said contact members.

12. In a double throw switch the combination of a shaft having a rocker arm thereon extending transversely thereof, means for rocking said shaft, finger portions extending from said rocker arm laterally of one side of said shaft, a contact strip formed substantially complementary to said rocker arm and finger portions, said strip also including contact portions extending from opposite ends thereof beyond said rocker arm, contact members mounted on the opposite side of said shaft from said finger portions and in alignment with said contact portions for selective engagement thereby in opposite closed positions of said switch, a contact spring urging said contact strip onto said rocker arm and providing for pivotal movement of said strip about said finger portions in a direction opposite to rocking movement of said shaft for wiping said contact portions against said contact members, and biasing means urging said rocker arm into a central open position intermediate said closed positions.

References Cited in the file of this patent

UNITED STATES PATENTS

| | | |
|---|---|---|
| 2,382,827 | Sprague et al. | Aug. 14, 1945 |
| 2,473,244 | Fuller | June 14, 1949 |

FOREIGN PATENTS

| | | |
|---|---|---|
| 536,310 | Great Britain | May 9, 1941 |